(12) United States Patent
Hohmann et al.

(10) Patent No.: US 10,180,291 B2
(45) Date of Patent: Jan. 15, 2019

(54) CHARGE AIR COOLER FOR A FRESH AIR SYSTEM OF AN INTERNAL COMBUSTION ENGINE

(71) Applicant: Mahle Behr GmbH & Co. KG, Stuttgart (DE)

(72) Inventors: Ellen Hohmann, Pforzheim (DE); Tobias Isermeyer, Lowenstein (DE); Timm Roeschmann, Nufringen (DE)

(73) Assignee: Mahle Behr GmbH & Co. KG (DE)

( * ) Notice: Subject to any disclaimer, the term of this patent is extended or adjusted under 35 U.S.C. 154(b) by 119 days.

(21) Appl. No.: 15/118,002

(22) PCT Filed: Jan. 21, 2015

(86) PCT No.: PCT/EP2015/051124
§ 371 (c)(1),
(2) Date: Aug. 10, 2016

(87) PCT Pub. No.: WO2015/121038
PCT Pub. Date: Aug. 20, 2015

(65) Prior Publication Data
US 2017/0016685 A1    Jan. 19, 2017

(30) Foreign Application Priority Data
Feb. 11, 2014   (DE) .......................... 10 2014 202 466

(51) Int. Cl.
*F28F 9/12* (2006.01)
*F02B 29/04* (2006.01)
(Continued)

(52) U.S. Cl.
CPC ............ *F28F 9/12* (2013.01); *F02B 29/0475* (2013.01); *F28F 9/0246* (2013.01);
(Continued)

(58) Field of Classification Search
CPC .......... F28F 9/12; F28F 21/062; F28F 21/084; F28F 9/0246; F28F 2230/00; F02B 29/0475
See application file for complete search history.

(56) References Cited

U.S. PATENT DOCUMENTS 3,400,755 A    9/1968   Banta
4,887,849 A   12/1989   Briet
(Continued)

FOREIGN PATENT DOCUMENTS

DE    19527050 A1    1/1997
DE    19536300 C1    4/1997
(Continued)

OTHER PUBLICATIONS

English abstract for DE-19536300.
(Continued)

*Primary Examiner* — Jacob Amick
*Assistant Examiner* — Charles Brauch
(74) *Attorney, Agent, or Firm* — Fishman Stewart PLLC

(57) ABSTRACT

A charge-air cooler for a fresh-air system of an internal combustion engine may include a cooler box and an upper shell such as a flange plate. The cooler box may include a cooler box passage opening, and the flange plate may include a flange plate passage opening arranged complementary with the cooler box passage opening. An adapter element may have a first end section and a second end section. The adapter element may be connected to a rim of the cooler box that borders the cooler box passage opening. A pipe element may be detachably secured to the adapter element and have a first end section and a second end section. The first end section of the adapter element and the (Continued)

first end section of the pipe element may define a clip-type connection when the adapter element and the pipe element are secured to one another.

19 Claims, 3 Drawing Sheets

(51) Int. Cl.
*F28F 21/06* (2006.01)
*F28F 21/08* (2006.01)
*F28F 9/02* (2006.01)

(52) U.S. Cl.
CPC .......... *F28F 9/0248* (2013.01); *F28F 9/0258* (2013.01); *F28F 21/06* (2013.01); *F28F 21/062* (2013.01); *F28F 21/084* (2013.01); *F28F 21/067* (2013.01); *F28F 2230/00* (2013.01); *F28F 2275/04* (2013.01); *F28F 2275/085* (2013.01); *Y02T 10/146* (2013.01)

(56) References Cited

U.S. PATENT DOCUMENTS

| | | |
|---|---|---|
| 6,474,698 B2 | 11/2002 | Dobler et al. |
| 6,848,723 B2 | 2/2005 | Lamich |
| 8,528,629 B2 | 9/2013 | Kalbacher |
| 8,695,574 B2 | 4/2014 | Nguyen |
| 2007/0131401 A1* | 6/2007 | Daly .................. B29C 65/1635 165/158 |
| 2009/0056922 A1* | 3/2009 | Hemminger .............. F28F 9/02 165/158 |

FOREIGN PATENT DOCUMENTS

| | | | |
|---|---|---|---|
| DE | 19957946 A1 | 6/2001 | |
| DE | 10203521 A1 | 7/2003 | |
| DE | 102006032205 A1 | 1/2008 | |
| DE | 102009015467 A1 | 9/2010 | |
| DE | 102009055715 A1 | 6/2011 | |
| DE | 102010063602 A1 * | 6/2012 | .......... F02B 29/0462 |
| EP | 1762806 A1 | 3/2007 | |
| EP | 2088299 A2 | 8/2009 | |
| FR | 2695466 A1 | 3/1994 | |

OTHER PUBLICATIONS

English abstract for DE-102009015467.
English abstract for EP-1762806.
English abstract for EP-2088299.
English abstract for FR-2695466.
English equivalent of DE-19527050.

* cited by examiner

CHARGE AIR COOLER FOR A FRESH AIR SYSTEM OF AN INTERNAL COMBUSTION ENGINE

CROSS-REFERENCE TO RELATED APPLICATIONS

This application claims priority to German Patent Application No. 10 2014 202 466.8, filed Feb. 11, 2014, and International Patent Application No. PCT/EP2015/051124, filed Jan. 21, 2015, both of which are hereby incorporated by reference in their entirety.

TECHNICAL FIELD

The invention relates to a charge-air cooler for a fresh-air system of an internal combustion engine, and to a fresh-air system having a charge-air cooler of said type. The invention also relates to an internal combustion engine having a fresh-air system of said type.

BACKGROUND

In modern motor vehicles, supercharged internal combustion engines are of ever-increasing importance because, by way of such supercharging, the power density of the internal combustion engine can be considerably increased. There is therefore also an increasing tendency for vehicles with relatively small engines to be equipped with suitable supercharging devices in order to thereby increase the power thereof and/or reduce the fuel consumption thereof. There is likewise an evident tendency for engines to be reduced in size while maintaining the same level of power, in the context of so-called "downsizing".

Supercharged internal combustion engines are generally equipped with a charge-air cooler in order for the charge air, which is supercharged for example by way of an exhaust-gas turbocharger and which is consequently heated, to be cooled again. Such cooling of the charge air increases the power of the internal combustion engine, reduces the fuel consumption and pollutant emissions thereof, and altogether reduces the thermal loading of the internal combustion engine as a whole.

The cooling of the charge air is realized by heat transfer from the charge air to the surroundings. This may be realized, as air-air heat transfer, by way of a so-called direct charge-air cooler, or indirectly through the additional use of an intermediate medium. As an intermediate medium, use is commonly made of cooling water. In the case of indirect charge-air cooling, at least two heat exchangers are used, typically a coolant cooler which dissipates the heat from the coolant to the surroundings, and a charge-air cooler which transfers the heat from the charge air to the coolant. Here, the indirect charge-air cooler may for example be composed of flat pipes which conduct the coolant and which, on the gas side, in order to improve the heat transfer, are connected to a rib structure, which rib structure serves firstly for the support of the flat pipes but is secondly also, in the charge-air cooler, integrated into the fluid path of the charge air to be cooled, in such a way that said charge air flows through said rib structure. The entire rib-pipe structure may be arranged between two so-called cooler boxes which fluidically communicate with the individual flat pipes and which serve for the distribution of coolant to the individual flat pipes. Here, one of the two cooler boxes serves both for the distribution of the coolant to the flat pipes and for the collection and discharging of the coolant from the charge-air cooler after said coolant has absorbed heat from the charge air. The two cooler boxes may in this case be attached to a common flange plate, which permits easy insertion of the charge-air cooler as a whole into a housing of a fresh-air system through which charge air flows.

After such installation of the charge-air cooler in the fresh-air system, the cooler box which serves for the introduction and discharge of coolant may be connected, as mentioned above, to a coolant circuit. For this purpose, there is commonly provided, on the cooler box, a first pipe connector which fluidically communicates with a first fluid region of the cooler box by way of which the coolant is distributed to the flat pipes. A second pipe connector which is likewise provided on the cooler box may communicate with a second fluid region, by way of which the coolant, after the exchange of heat with the charge air to be cooled, can consequently emerge from the cooler box again.

The mounting of an indirect charge-air cooler in an intake pipe is known from DE102009055715A1.

SUMMARY

The present invention is now concerned with the problem of providing a charge-air cooler which is equipped with one or more pipe connectors, which are improved in terms of construction, for the introduction and discharging of coolant into and out of the cooler box of the charge-air cooler. It is also the object of the invention to provide a fresh-air system having a charge-air cooler of said type. Finally, it is the object of the invention to provide an internal combustion engine which has a fresh-air system of said type.

Said objects are achieved by way of the subject matter of the independent patent claims. The dependent patent claims relate to preferred embodiments.

It is accordingly a basic concept of the invention for said pipe connector for the introduction and discharging of coolant into and out of the cooler box of the charge-air cooler—hereinafter referred to as pipe element—to be structurally designed such that it can, with an adapter element permanently attached to the cooler box, form a clip-type connection such that the pipe element can be detachably fastened to the adapter element by being simply clipped on.

The charge-air cooler according to the invention is, for this purpose, equipped with a cooler box which has a cooler box passage opening. To make it possible for the charge-air cooler as a whole to be installed as a unit in a fresh-air system of a motor vehicle, said charge-air cooler furthermore has a flange plate in which there is provided a flange plate passage opening which is aligned with the cooler box passage opening. The adapter element, which is required for the clip-type connection to the pipe element and which has a first and a second end section, is inserted by way of its second end section into the flange plate passage opening and is cohesively connected to a rim, which borders the cooler box passage opening, of the cooler box. The clip-type connection according to the invention between adapter element and pipe element is realized by way of the two first end sections of the two components.

The charge-air cooler according to the invention thus makes it possible for the pipe element to be separately mounted on, and dismounted from, the charge-air cooler in a simple manner, for example after said charge-air cooler has been installed in a fresh-air system.

Furthermore, the use of individual pipe elements is possible, which themselves may be realized as adapter components which permit the attachment of the charge-air cooler to coolant circuits with different connectivity: for this purpose, it is merely necessary for the pipe element to be equipped, in the region of its second end section situated opposite the first end section, with a flange geometry which is suitable for attachment to the coolant circuit. It is self-evidently possible for the charge-air cooler according to the invention to be equipped not only with a single adapter element-pipe element pair; rather, it is expedient for both the pipe element for the introduction of coolant into the cooler box and the pipe element for the discharging of the coolant out of said cooler box to be designed in the manner according to the invention.

In a preferred embodiment, cooler box and adapter element are produced from a metal. This makes it possible for the adapter element to be permanently fastened to the cooler box by way of a cohesive connection. It is thus conceivable, for example, for the second end section of the adapter element to be welded or brazed to the cooler box. Owing to its low inherent weight, the use of aluminum as metal for the production of the cooler box and adapter element is particularly recommended.

By contrast, it is particularly expediently the case that the flange plate is produced from plastic at least in the region of a rim which borders the flange plate passage opening. This variant expressly encompasses embodiments in which the flange plate is manufactured from plastic not only in the region of said rim but almost completely or entirely. Alternatively or in addition, the pipe element may also be produced from a plastic. In the latter case, the pipe element and flange plate may have the same coefficients of thermal expansion, such that the two components, which are flowed through by coolant during operation and which are thus subject to considerable temperature fluctuations, expand and contract to the same extent. In this way, temperature-induced mechanical stresses at the interfaces between the two components, which could call into question the fluid sealing action at the pipe element-adapter element interface, can be substantially avoided. Furthermore, plastic has resiliently elastic material characteristics which are advantageous for the formation of a clip-type connection.

To ensure a mechanically stable fastening of the pipe element to the adapter element and thus to the charge-air cooler, it is proposed that the two first end sections of pipe element and adapter element be provided with a geometric shaping of substantially mutually complementary design.

What has proven to be particularly advantageous for the fluidic coupling of the pipe element to the adapter element is an embodiment in which the adapter element has a hollow cylindrical main body; here, on the outer side of said hollow cylindrical main body, there is arranged a radially outwardly protruding rib which extends along the circumferential direction of the main body. Furthermore, a fastening collar is arranged on the first end section of the adapter element, which fastening collar protrudes radially outward from the main body and extends along the circumferential direction of said main body, and which fastening collar serves for the formation of a clip-type connection to the pipe element.

For the formation of a strong clip-type connection to the adapter element, an embodiment has proven to be particularly advantageous in which the pipe element is in the form of a hollow body, in particular a hollow cylinder, such that a first opening is provided at the first end section of the pipe element and a second opening is provided at the second end section of said pipe element. In order that an insertion of the pipe element into the adapter element, which takes place before the clipping to the adapter element, is made as easy as possible, and in order to furthermore ensure that the pipe element can be supported on the adapter element in a stable manner, it is expedient for the pipe element to be equipped, in the region of the first end section, with a first pipe collar which borders the first opening of said first end section and which protrudes radially outward from the hollow body, and for a second pipe collar to be provided on said first pipe collar, which second pipe collar protrudes in an axial direction from said first pipe collar.

In a refining embodiment, adapter element and pipe element are designed such that, in a state in which the two elements are fastened to one another by way of the clip-type connection, the first pipe collar of the pipe element is supported on the fastening collar of the adapter element. In this state, the rib of the adapter element engages into a receiving groove which is provided radially at the inside on the second pipe collar and which extends along the circumferential direction of said second pipe collar. The receiving groove and rib thus interact in the manner of a detent connection; to facilitate the engagement of the rib into the receiving groove with detent action during the mounting of the pipe element on the adapter element, it is possible for the two components to be dimensioned such that, during the insertion of the pipe element into the adapter element, the rib is preloaded against the hollow cylindrical main body of said adapter element.

In the state in which the pipe element is mounted on the adapter element, the interior of the hollow cylindrical main body of the adapter element and the hollow body of the pipe element form a fluid duct through which coolant can flow; to fluidically seal off said fluid duct to the outside with respect to the surroundings, it is recommended that, in a recess formed by the region between rib and fastening collar, there be provided a first seal element, in particular a seal ring, which seals off the adapter element against the pipe element.

To seal off the cooler box against the adapter element, a second seal element may be provided as an alternative or in addition to the first seal element. Said second seal element may preferably also be in the form of a seal ring and fitted in the region of the rim, which borders the flange plate passage opening, such that said second seal element seals off the cooler box against the adapter element.

In a structurally preferred embodiment, the first and second end sections of the pipe element are arranged at an angle of 90° relative to one another. This may be achieved for example by virtue of the pipe element as a whole being of right-angled form.

The invention also relates to a fresh-air system for an internal combustion engine. The fresh-air system comprises an adequately dimensioned housing which can be incorporated into an intake duct of an internal combustion engine, such that the housing is flowed through by the charge air which is to be cooled before being introduced into the combustion chamber. The fresh-air system is equipped with a charge-air cooler with one or more of the features discussed above. In the housing of the fresh-air system there is provided a passage opening through which the charge-air cooler can be inserted into the housing from the outside, such that the charge-air cooler is arranged in the interior of the housing and the flange plate closes off the passage opening. In a further embodiment, the intake housing is of at least two-shell form, wherein at least one shell has apertures for the leadthrough of connectors. A flange plate can be dispensed with. The installation of the cooler is preferably performed before the joining of the intake housing shells.

Further important features and advantages of the invention will emerge from the subclaims, from the drawings and from the associated description of the figures on the basis of the drawings.

It is self-evident that the features mentioned above and the features yet to be discussed below may be used not only in the respectively specified combination but also in other combinations or individually, without departing from the scope of the present invention.

Preferred exemplary embodiments of the invention are illustrated in the drawings and will be discussed in more detail in the following description, wherein the same reference signs are used to denote identical or similar or functionally identical components.

DETAILED DESCRIPTION

Figure 1:
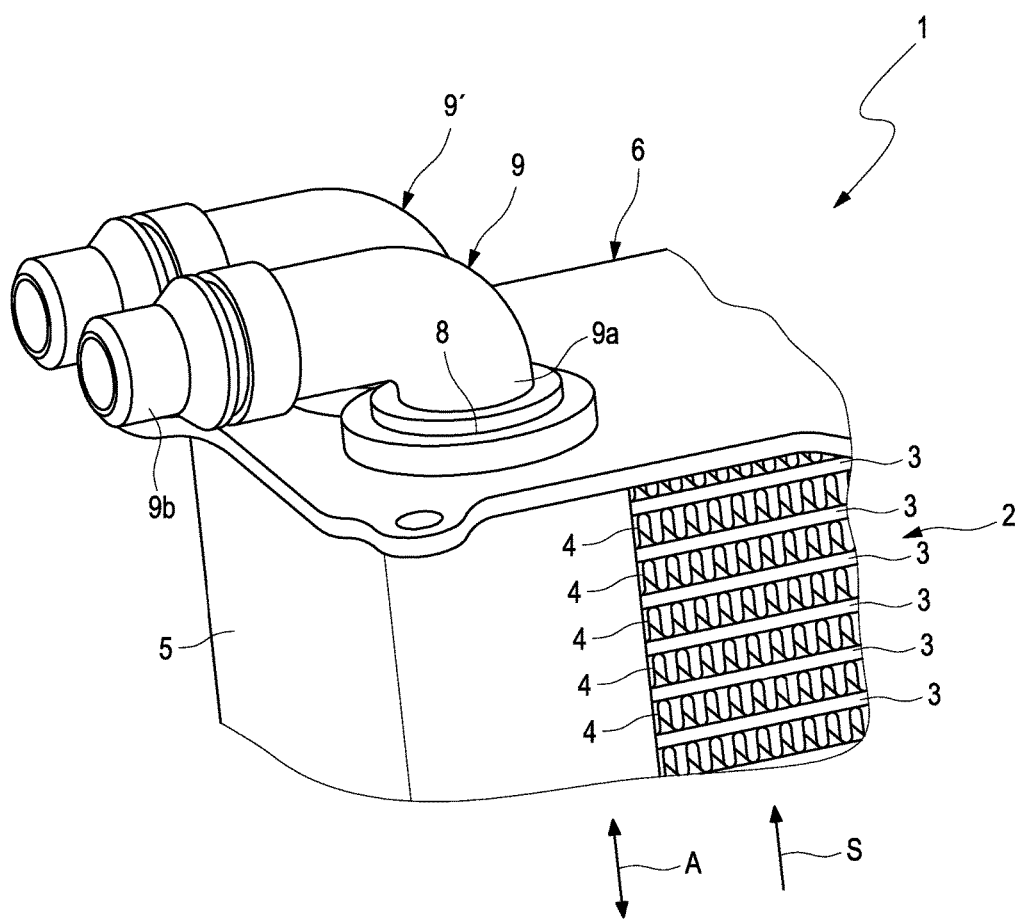
FIG. 1 shows an example of a charge-air cooler according to the invention in a partial view.
Figure 2:
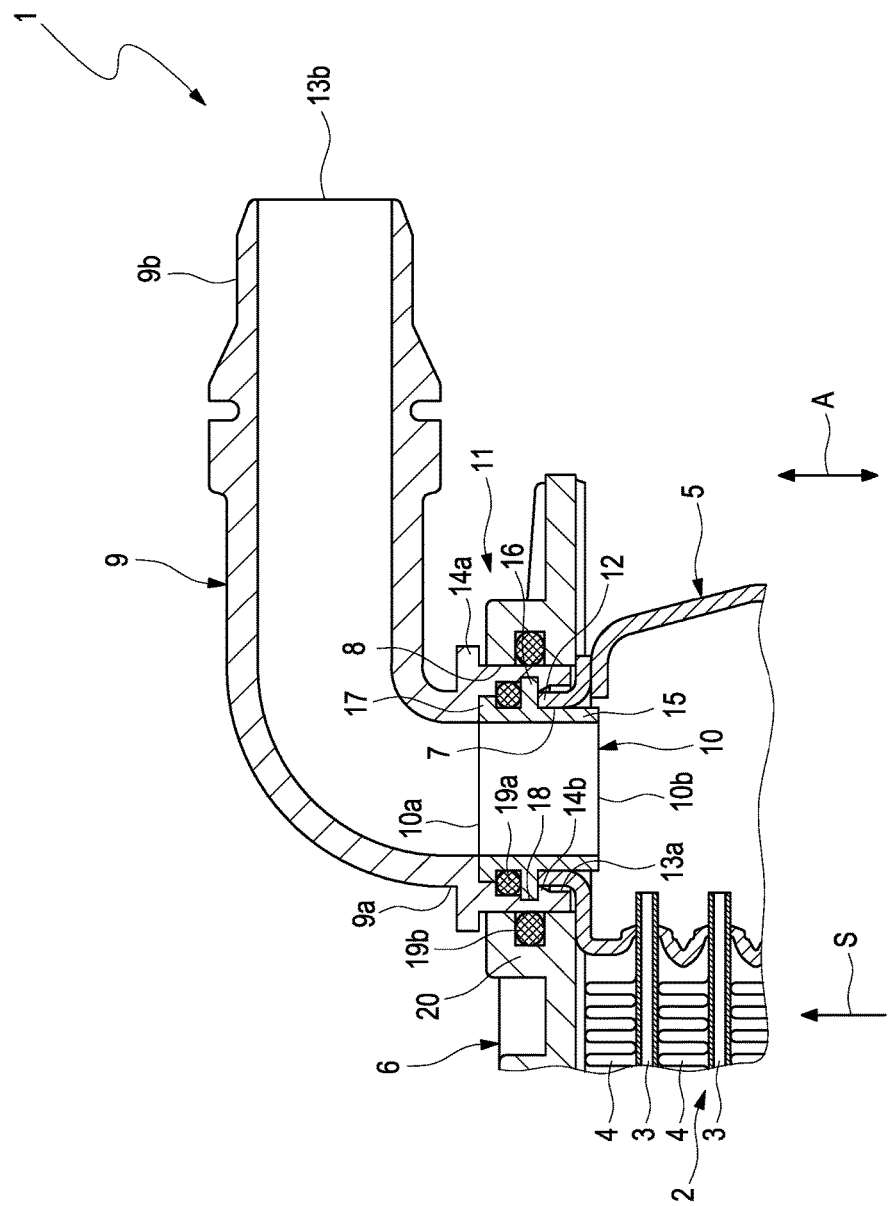
FIG. 2 shows the charge-air cooler of FIG. 1 in a longitudinal section.

FIG. 1 illustrates, in a perspective illustration and in a partial view, a charge-air cooler 1 according to the invention, and FIG. 2 shows the charge-air cooler 1 in a longitudinal section. Here, FIG. 1 shows, in a detail, the major components of the charge-air cooler 1; these include a rib-pipe structure 2 with a multiplicity of flat pipes 3 which are stacked one on top of the other and between which, along a stacking direction S, there is provided in each case one rib structure 4. The flat pipes 3 are, in a manner known to a person skilled in the art, flowed through by a coolant, whereas the rib structures 4 themselves are flowed through by the charge air to be cooled.

Also shown is a cooler box 5 which is connected to the rib-pipe structure 2 and via which coolant is introduced into and discharged from the flat pipes 3. The cooler box is fastened to a flange plate 6, by way of which the charge-air cooler 1 can be inserted, as a unit, into a housing 31 of a fresh-air system 30 (cf. FIG. 3) in order to cool the charge air flowing through the fresh-air system. The cooler box 5 is equipped with a cooler box passage opening 7, and the flange plate 6 is correspondingly equipped with a flange plate passage opening 8, which in turn is aligned with the cooler box passage opening 7.

The introduction of coolant into, and discharge of coolant from, the cooler box 5 is realized via a pipe element 9 which can be detachably fastened by way of a clip-type connection 11 to an adapter element 10 which is attached to the cooler box 5.

The adapter element 10, which has a first and a second end section 10a, 10b, is inserted by way of its second end section 10b into the flange plate passage opening 8, and is cohesively connected, for example by way of a brazed or welded connection, to a rim 12, which borders the cooler box passage opening 7, of the cooler box 5. Cooler box 5 and adapter element 10 are, for this purpose, produced from a metal, such that the second end section 10b of the adapter element 10 can be easily brazed or welded to the cooler box 5. Here, owing to its low inherent weight, the use of aluminum as material for the production of the cooler box 5 and adapter element 10 is particularly recommended. The clip-type connection 11 between adapter element 10 and pipe element 9 is formed in the region of the two first end sections 10a, 9a of the two components 10, 9. For this purpose, the two first end sections 10a, 9a of pipe element 10 and adapter element 9, respectively, have a substantially complementary geometric shaping.

At least in the region of a rim which borders the flange plate passage opening 8, the flange plate 6 is produced from plastic. In a variant, the flange plate 6 may also be manufactured entirely from plastic. In the example scenario proposed here, the pipe element 9 is also produced from plastic. Consequently, the pipe element 9 and flange plate 6 exhibit the same coefficients of thermal expansion, such that the two components 9, 6, through which coolant flows during operation and which are thus subject to considerable temperature fluctuations, expand and contract to the same extent. In this way, temperature-induced mechanical stresses at the interfaces between the two components 9, 6, which could call into question the fluid sealing action at the flange plate-pipe element interface, can be substantially avoided. Furthermore, plastic has resiliently elastic material characteristics which are advantageous for the formation of the clip-type connection 11.

The adapter element 10 has a hollow cylindrical main body 15; on the outer side thereof, there is provided a radially outwardly protruding rib 16 which extends along the circumferential direction of the main body 15. Furthermore, on the first end section 10a of the adapter element 10, for the formation of the clip-type connection to the pipe element 9, there is provided a fastening collar 17 which protrudes radially outward from the main body 15 and which extends along the circumferential direction thereof.

The pipe element 9 is formed as a hollow body in the form of a hollow cylinder, such that a first opening 13a is provided at the first end section 9a of the pipe element 9 and a second opening 13b is provided at the second end section 9b of said pipe element. In the example of FIG. 2, the first and the second end section 9a, 9b of the pipe element 9 are arranged at an angle of 90° relative to one another. For the clipping of the pipe element 9 to the adapter element 10, the pipe element 9 is inserted into the adapter element 10. For this purpose, the pipe element 9 is, in the region of the first end section 9a, equipped with a first pipe collar 14a which borders its first opening 13a and which protrudes radially outward from the hollow body and on which, in turn, there is formed a second pipe collar 14b, which protrudes in an axial direction A from said first pipe collar.

The adapter element 10 and pipe element 9 are furthermore designed such that, in a state in which the two components 9, 10 are fastened to one another by way of the clip-type connection 11, the first pipe collar 14a of the pipe element 9 is supported on the fastening collar 17 of the adapter element 10. In this state, it is also the case that the rib 16 of the adapter element 10 engages into a receiving groove 18, which is provided radially at the inside on the second pipe collar 14b and which extends along the circumferential direction thereof. The receiving groove 18 and rib 16 thus interact in the manner of a detent connection. In order, during insertion of the pipe element 9, to promote engagement of the rib 16 into the receiving groove 18 on the adapter element with detent action, the two components may be dimensioned such that, during the insertion of the pipe element 9 into the adapter element 10, the rib 16 is preloaded against the hollow cylindrical main body 15 of said adapter element.

In the state illustrated in FIGS. 1 and 2 in which the pipe element 9 is mounted on the adapter element 10, the interior of the hollow cylindrical main body 15 of the adapter element 10 forms, together with the hollow body of the pipe element 9, a fluid duct through which coolant can flow; around this, in a recess which is formed by the region between rib 16 and fastening collar 17, there is arranged a seal element 19a which is in the form of a seal ring and which seals off the adapter element 10 against the pipe element 9.

In order for the cooler box 5 to analogously be sealed off against the adapter element 10, a second seal element 19b is additionally provided in the region of the rim 12 which borders the flange plate passage opening 8.

It can also be seen in FIG. 1 that, on the charge-air cooler 1, there is provided not only a single pipe element 9, which serves for the introduction of coolant into the cooler box, but additionally to this a second pipe element 9', via which the coolant is discharged from the cooler box 5 again after the exchange of heat with the charge air to be cooled. The construction of the pipe element 9' corresponds to that of the pipe element 9 discussed above; this expressly also applies to the fastening according to the invention of the pipe element 9' to the cooler box 5 by way of an adapter element; all of the above explanations relating to the pipe element 9 thus also apply, mutatis mutandis, to the pipe element 9'.

Figure 3:
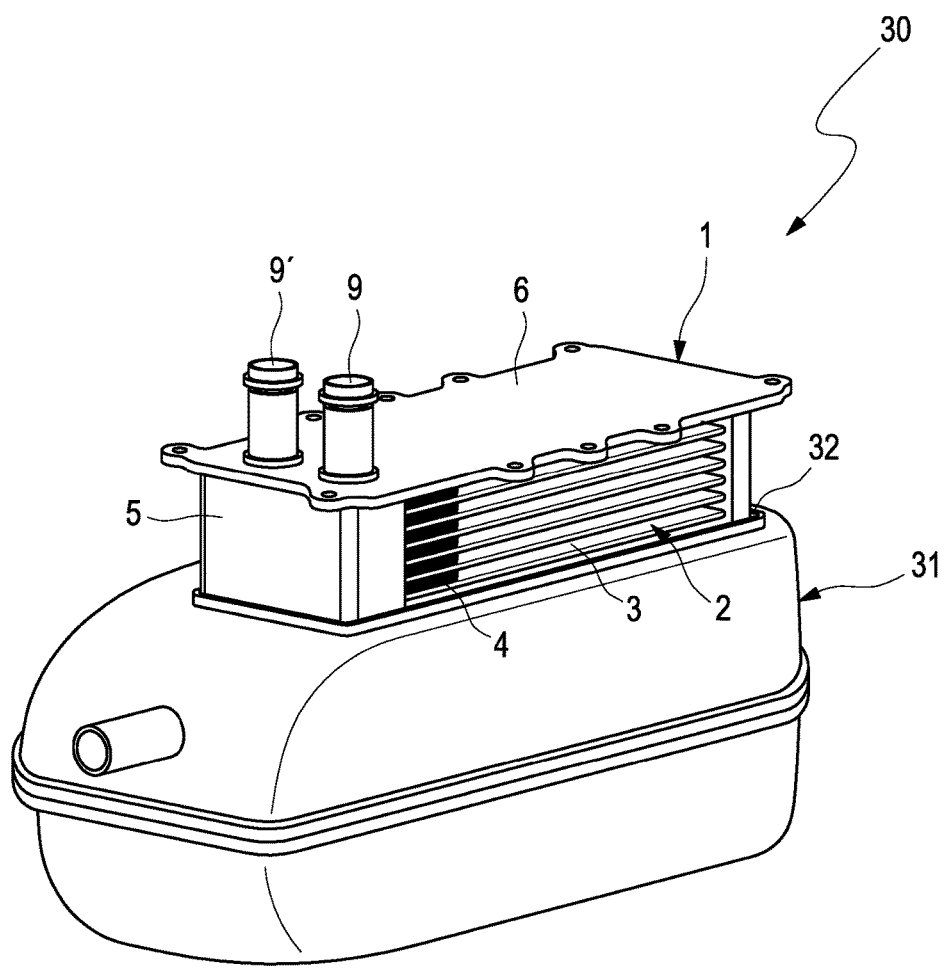
FIG. 3 shows an example of a fresh-air system of an internal combustion engine having the charge-air cooler of FIGS. 1 and 2.

Finally, FIG. 3 illustrates, by way of example, the use of the charge-air cooler 1 according to the invention in a fresh-air system 30 of an internal combustion engine. Said fresh-air system comprises a housing 31 for the introduction of charge air into a combustion chamber of the internal combustion engine (not shown) and has the charge-air cooler 1 according to the invention. In the housing 31 there is provided a passage opening 32 through which the charge-air cooler 1 can be inserted as a unit into the housing 31 from the outside, such that the charge-air cooler 1 is arranged in the interior of the housing 31 and the flange plate 6 closes off the passage opening 32.

The invention claimed is:

1. A charge-air cooler for a fresh-air system of an internal combustion engine, comprising:
    a cooler box including at least one cooler box passage opening;
    an upper shell including at least one flange plate passage opening arranged complementary with the at least one cooler box passage opening;
    an adapter element having at least a first end section and a second end section, the adapter element insertable into the at least one flange plate passage opening via the second end section and connected to a rim of the cooler box bordering the at least one cooler box passage opening;
    a pipe element detachably securable to the adapter element and having at least a first end section and a second end section, wherein the first end section of the adapter element and the first end section of the pipe element define a clip-type connection when the adapter element and the pipe element are secured to one another;
    wherein the second end section of the adapter element is fastened to the rim of the cooler box at a cohesive joint;
    wherein the cohesive joint includes at least on of a welded connection and a brazed connection.

2. The charge-air cooler as claimed in claim 1, wherein the cooler box and the adapter element are each composed of a metal and are cohesively fastened to one another.

3. The charge-air cooler as claimed in claim 1, wherein at least one of:
    the upper shell is composed of a plastic at least in a rim region surrounding the at least one flange plate passage opening; and
    the pipe element is composed of a plastic.

4. The charge-air cooler as claimed in claim 1, wherein the first end sections of the pipe element and the first end section of the adapter element have a substantially mutually complementary geometric shaping.

5. The charge-air cooler as claimed in claim 1, wherein the adapter element includes a hollow cylindrical main body, wherein a radially outwardly protruding rib is disposed on an outer side of the main body and extends along a circumferential direction of the main body; and
    further wherein a fastening collar is disposed on the first end section of the adapter element, and wherein the fastening collar protrudes radially outward from the main body and extends along the circumferential direction of the main body.

6. The charge-air cooler as claimed in claim 1, wherein the pipe element is structured as a hollow body, and a first opening is disposed at the first end section of the pipe element and a second opening is disposed at the second end section of the pipe element;
    wherein the pipe element includes a first pipe collar in a region of the first end section, the first pipe collar borders the first opening and protrudes radially outward from the pipe element; and
    wherein the pipe element further includes a second pipe collar disposed on the first pipe collar, wherein the second pipe collar protrudes in an axial direction from the first pipe collar.

7. The charge-air cooler as claimed in claim 6, wherein when the pipe element is secured to the adapter element to define the clip-type connection:
    the first pipe collar of the pipe element is supported on a fastening collar of the adapter element; and
    an outwardly protruding rib disposed on the adapter element engages into a receiving groove disposed on a radial inside of the second pipe collar, wherein the receiving groove extends along a circumferential direction of the second pipe collar.

8. The charge-air cooler as claimed in claim 6, wherein the adapter element includes a radially outwardly protruding rib and a radially outwardly protruding fastening collar each extending along a circumferential direction of the adapter element, and wherein a recess is disposed in a region between the rib and the fastening collar, and a seal element is arranged in the recess to seal off the adapter element against the pipe element.

9. The charge-air cooler as claimed in claim 1, further comprising a rim arranged around the at least one flange plate passage opening, wherein a seal element is arranged in a region of the rim and seals off the cooler box against the adapter element.

10. The charge-air cooler as claimed in claim 1, wherein the pipe element is structured in a right-angled configuration.

11. A fresh-air system for an internal combustion engine, comprising:
    a housing for introducing charge air into a combustion chamber of the internal combustion engine; and
    a charge-air cooler, the charge-air cooler including:
        a cooler box including at least one cooler box passage opening and a rim surrounding the at least one cooler box passage opening;

a flange plate including at least one flange plate passage opening arranged complementary to the at least one cooler box passage opening;

an adapter element connected to the rim of the cooler box and having at least a first end section and a second end section, wherein the adapter element is insertable into the at least one flange plate passage opening via the second end; and a pipe element securable to the adapter element and having at least a first end section and a second end section, the pipe element structured as a hollow body having a first opening disposed at the first end section and a second opening disposed at the second end section;

a first pipe collar disposed in a region of the first end section of the pipe element and surrounding the first opening of the pipe element, the first pipe collar protruding radially outwardly from the pipe element;

a second pipe collar disposed on the first pipe collar, the second pipe collar protruding in an axial direction from the first pipe collar;

wherein the first end section of the adapter element and the first end section of the pipe element define a clip-type connection when the adapter element and the pipe element are secured to one another;

wherein the first pipe collar is supported on a fastening collar of the adapter element when the pipe element and the adapter element are secured to one another, and a radially outwardly protruding rib disposed on the adapter element engages into a receiving groove provided on a radial inside of the second pipe collar when the pipe element and the adapter element are secured to one another, the receiving groove extending along a circumferential direction of the second pipe collar; and wherein the housing includes a passage opening and the charge-air cooler is insertable from an external side through the passage opening into an interior of the housing such that the charge-air cooler is arranged in the interior of the housing and the flange plate of the charge-air cooler closes off the passage opening.

12. An internal combustion engine, comprising a combustion chamber and a fresh-air system, the fresh-air system including:

a housing for introducing charge air into the combustion chamber, the housing including a passage opening; and a charge-air cooler, the charge-air cooler including:

a cooler box including at least one cooler box passage opening and a rim surrounding the at least one cooler box passage opening;

a flange plate including at least one flange plate passage opening arranged complementary to the at least one cooler box passage opening;

an adapter element connected to the rim of the cooler box and having at least a first end section and a second end section, wherein the adapter element is insertable into the at least one flange plate passage opening via the second end; and a pipe element securable to the adapter element and having at least a first end section and a second end section;

wherein the first end section of the adapter element and the first end section of the pipe element define a clip-type connection when the adapter element and the pipe element are secured to one another;

wherein the second end section of the adapter element is cohesively connected to the rim of the cooler box via at least one of a brazed connection and a welded connection; and wherein the charge-air cooler is insertable from an external side through the passage opening into the housing such that the charge-air cooler is arranged in an interior of the housing and the flange plate of the charge-air cooler closes off the passage opening.

13. The internal combustion engine as claimed in claim 12, wherein the cooler box and the adapter element are each composed of a metal.

14. The internal combustion engine as claimed in claim 12, wherein the adapter element includes a hollow cylindrical main body, and further including at least one of:

a radially outwardly protruding rib disposed on an external side of the main body and extending along a circumferential direction of the main body; and a fastening collar disposed on the first end section of the adapter element, wherein the fastening collar protrudes radially outwardly from the main body and extends along a circumferential direction of the main body.

15. The internal combustion engine as claimed in claim 14, wherein the pipe element is structured as a hollow body having a first opening disposed at the first end section and a second opening disposed at the second end section;

further including a first collar disposed in a region of the first end section and surrounding the first opening of the pipe element, wherein the first collar protrudes radially outwardly from the pipe element; and a second collar disposed on the first collar, wherein the second collar protrudes in an axial direction from the first pipe collar.

16. The internal combustion engine as claimed in claim 15, wherein the first collar is supported on the fastening collar when the pipe element and the adapter element are secured to one another; and the rib engages the second collar via a receiving groove disposed on a radial inside of the second collar when the pipe element and the adapter element are secured to one another, wherein the receiving groove extends along a circumferential direction of the second collar.

17. The fresh-air system as claimed in claim 11, wherein the adapter element is structured as a hollow cylindrical body;

further including a radially outwardly protruding rib disposed on an external side of the adapter element and extending along a circumferential direction of the adapter element; and a radially outwardly protruding collar disposed at the first end section of the adapter element and extending along the circumferential direction of the adapter element.

18. The fresh-air system as claimed in claim 17, further comprising a seal ring disposed in a recess defined between the rib and the collar, wherein the seal ring seals off the adapter element against the pipe element.

19. The fresh-air system as claimed in claim 11, wherein the second end section of the adapter element is cohesively connected to the rim of the cooler box via at least one of a brazed connection and a welded connection.

* * * * *